US006912976B2

(12) United States Patent
Everett

(10) Patent No.: US 6,912,976 B2
(45) Date of Patent: Jul. 5, 2005

(54) EXERCISE HARNESS FOR AN ANIMAL

(76) Inventor: Jacqui Everett, 5225 Blakeslee Ave., #309, N. Hollywood, CA (US) 91601

( * ) Notice: Subject to any disclaimer, the term of this patent is extended or adjusted under 35 U.S.C. 154(b) by 0 days.

(21) Appl. No.: 10/718,402

(22) Filed: Nov. 20, 2003

(65) Prior Publication Data

US 2004/0099221 A1 May 27, 2004

Related U.S. Application Data

(60) Provisional application No. 60/427,456, filed on Nov. 20, 2002.

(51) Int. Cl.$^7$ ............................................. A01K 15/02
(52) U.S. Cl. ..................... 119/858; 119/850; 119/712; 54/71
(58) Field of Search ................................. 119/858, 850, 119/856, 712; 54/71, 79, 79.2, 79.4; 2/102

(56) References Cited

U.S. PATENT DOCUMENTS

| 4,344,620 | A | * | 8/1982 | Debski | ...................... 482/105 |
|---|---|---|---|---|---|
| 4,382,302 | A | * | 5/1983 | Watson | ........................... 2/102 |
| 4,530,309 | A | * | 7/1985 | Collins | ........................ 119/863 |
| 4,577,591 | A | * | 3/1986 | Wesseldine | .................. 604/391 |
| 4,602,387 | A | * | 7/1986 | Zakrzewski | .................... 2/102 |
| 4,658,442 | A | * | 4/1987 | Tomlinson et al. | .............. 2/94 |
| 4,989,267 | A | * | 2/1991 | Watson | ........................... 2/102 |
| 5,127,213 | A | * | 7/1992 | Petronio | ........................ 54/71 |
| 5,769,030 | A | * | 6/1998 | Acoff | .......................... 119/712 |
| 6,675,391 | B2 | * | 1/2004 | Morrison | ........................ 2/102 |
| 2002/0152534 | | * | 10/2002 | Morrison | ........................ 2/102 |
| 2003/0019010 | | * | 1/2003 | Franco-Sion | ................... 2/102 |
| 2003/0177984 | | * | 9/2003 | Newman | ..................... 119/850 |

* cited by examiner

Primary Examiner—Yvonne R. Abbott
(74) Attorney, Agent, or Firm—Milde & Hoffberg, LLP

(57) ABSTRACT

An exercise harness for an animal which comprises three elements: (a) a web of flexible material adapted to be affixed to the body of the animal in a region adjacent to the animal's front legs and/or rear legs; (b) at least one strap, connected to the web and adapted to retain the web on the animal; and (c) a measured weight attached to the web by a holding device, such as a pocket, clip or the like. This weight is preferably removable and replaceable with weights of different sizes.

28 Claims, 4 Drawing Sheets

EXERCISE HARNESS FOR AN ANIMAL

CROSS REFERENCE TO RELATED APPLICATION

This present application claims benefit of priority from U.S. Provisional Application Ser. No. 60/427,456, filed Nov. 20, 2002, entitled "MUSCLE MAX-EXERCISE HARNESS".

BACKGROUND OF THE INVENTION

The present invention relates to an exercise harness for an animal, particularly an animal which leads a relatively sedentary life.

Domesticated animals such as dogs and cats, as well as animals in zoos, circuses and farms, such as horses, elephants and like, which lead a sedentary life tend to become overweight, lethargic and even suffer from health problems such as hip dysplasia due to lack of exercise. A leading veterinarian has said that "sixty percent of all dogs seen in my office are overweight." The same problem applies to many other small, medium and even large animals, who have no opportunity to fully exercise their muscles as they were designed to do in the wild.

SUMMARY OF THE INVENTION

It is a principal object of the present invention to provide a device which may be worn by an animal for limited periods of time to add muscle mass and extend lung function, thereby increasing the flow of freshly oxygenated blood to the animals' vital organs.

As used herein, the term "animal" is to be understood to refer to a four-legged mammal; that is, a mammal having (1) a pair of front legs and a pair of rear legs, (2) a body supported by these four legs and (3) a neck and head arranged on the body above the front legs. As is well known, the body of the animal forms a chest in the region of the front legs, an abdomen with a back on top and a belly on the bottom between the front legs and rear legs and a hip in the region of the rear legs. This terminology will be used in explaining the invention.

The above noted object, as well as further objects which will become apparent from the discussion that follows, are achieved, in accordance with the present invention, by providing an exercise harness for an animal which comprises at least three elements:

(a) a web of flexible material adapted to be affixed to the body of the animal in a region adjacent to the animal's of front legs and/or rear legs;
(b) at least one strap, connected to the web and adapted to retain the web on the animal; and
(c) a measured weight attached to the web by a holding device, such as a pocket, clip or the like. This weight is preferably removable and replaceable with weights of different sizes.

According to the invention, the web of flexible material is adapted to be affixed to the animal's body in such a manner and position that the weight or weights which are attached thereto are located against the body in the region adjacent either the front legs or rear legs of the animal, or both. It is particularly important that the animal not be weighted down at the approximate center of its body—i.e., halfway between the front and rear legs—since this can lead to spinal injury such as subluxations, causing the animal much discomfort.

The exercise harness, with the proper amount of weight, should be affixed to the animal for periods of ten to thirty minutes at least once a day (at least initially). After the animal has worn the harness for approximately two to four weeks, and its body has become accustomed to the weight the harness is holding, the animal can wear the harness, and carry the weight, for longer intervals, and the amount of the weight can be increased. In essence, the exercise harness causes the animal to work harder while walking, thus increasing the heart rate, breathing and blood flow. The weight causes the front legs and muscles, and/or the hind legs and muscles, to pull harder together to increase muscle mass and expand the lungs. Over time, the animal will experience a feeling of good health, good sleep and will acquire additional energy, the kind of energy that lasts throughout the day.

The weight, which is attached to the web of the exercise harness, may be of any suitable type: for example, the weight may be made of iron, steel, wood or sand. The weight may even be in liquid form, such as water, contained in a bottle or flexible sack. The web, to which the weight is attached, may be made of any suitable flexible material such as fabric, leather, canvas or even plastic sheet.

It is important that the exercise harness be easy to apply to an animal and that it be worn snugly with a minimum of discomfort.

In a first preferred embodiment of the invention, the web is adapted to at least partially cover the chest of the animal with the straps being adapted to retain the web on the animal's chest, just above the front legs.

Advantageously, in this embodiment the web is substantially rectangular in shape and has a central longitudinal axis which is adapted to extend longitudinally from front to rear along the chest of the animal between the two front legs. In order to increase the comfort of the animal, the portion of the web which extends between the two front legs may be reduced in width. For example, this portion of the web may be made trapezoidal in shape.

In this embodiment, the holding device is adapted to hold the weight on the web at a point located substantially between, or just in front of, the front legs of the animal. This holding device is preferably a pocket which may be closed by a snap, zipper or hook and hoop fastener.

To hold the web in place, in this first embodiment, the exercise harness preferably includes at least two straps, a first strap extending over the neck of the animal in front of the pair of front legs and a second strap extending over the body of the animal behind the front legs. If the web extends further rearward behind the front legs along the belly of the animal, it is preferably held by a third strap extending over the animal's body.

In a second preferred embodiment of the invention, the web is adapted to at least partially cover the belly of the animal in the region of the animal's hind legs. In this case, the web is advantageously substantially rectangular in shape and is adapted to extend from front to rear along the belly of the animal between the front and rear legs. Whether the animal be male or female, an opening is preferably provided on the web, which may also be substantially rectangular in shape, in the area where the male genitalia would appear. The exercise harness is thus made gender neutral.

In this embodiment, the web is retained by at least one strap which extends over the body of the animal behind the pair of front legs and in front of the pair of rear legs. A second strap may be provided to extend around the rear of the animal's body behind its two rear legs and below its tail.

In a third embodiment of the invention, two exercise harnesses may be provided: one adjacent the front legs and another adjacent the rear legs of the animal. In this case, the two harnesses are preferably interconnected by one or more longitudinally extending straps.

Preferably, all of the straps on an exercise harness are made separable by snap clips or the like, so that the straps may be easily connected together or disconnected as desired.

The device for holding the weight or weights on the web should permit the attachment of weights of different sizes and/or shapes. The device may hold the weights either beneath the animal, for example on the animal's chest or on each side of the animal's body. In all cases, however, the weights should be held in a region adjacent to either the front legs or the rear legs of the animal to avoid spinal injury.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
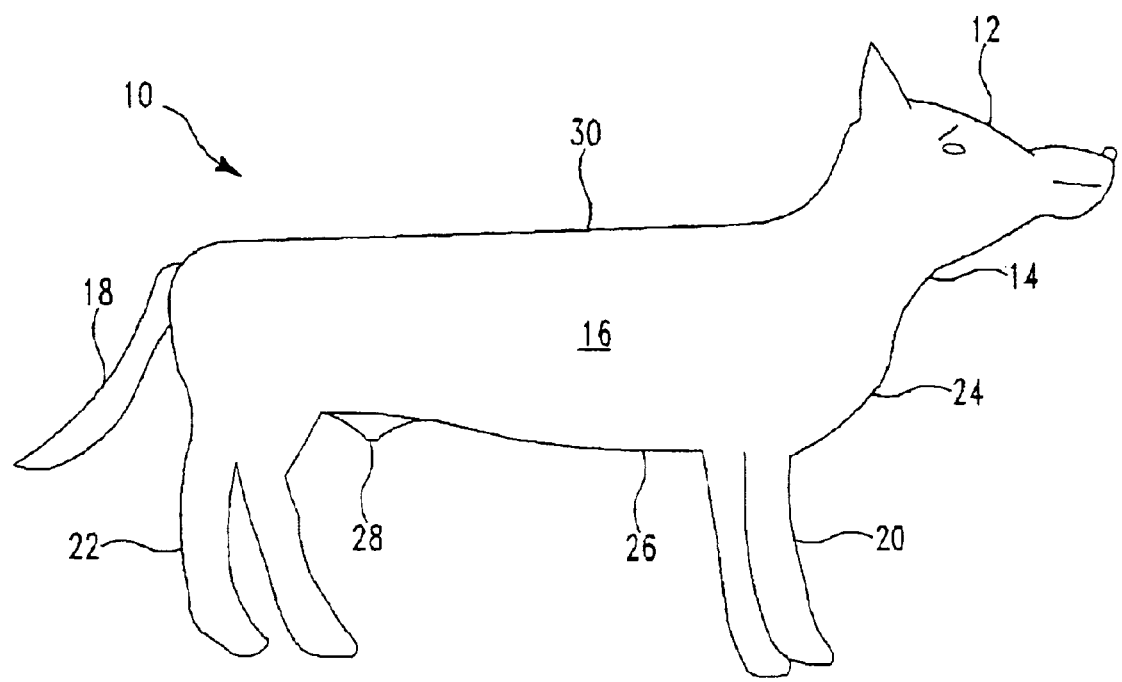
FIG. 1 is a representational diagram of a dog, showing various parts of the dog's anatomy.

The preferred embodiments of the present invention will now be described with reference to FIGS. 1–5 of the drawings. Identical elements in the various figures are designated with the same reference numerals.

FIG. 1 illustrates an average size dog 10 having a head 12, neck 14, body 16 and tail 18. The dog's body supports two front legs 20 and two rear legs 22. Beneath the body are the dog's chest 24 and belly 26; also, in the case of a male dog, his genitalia 28.

The dog's body 16 also forms a back or spine 30.

Figure 2:
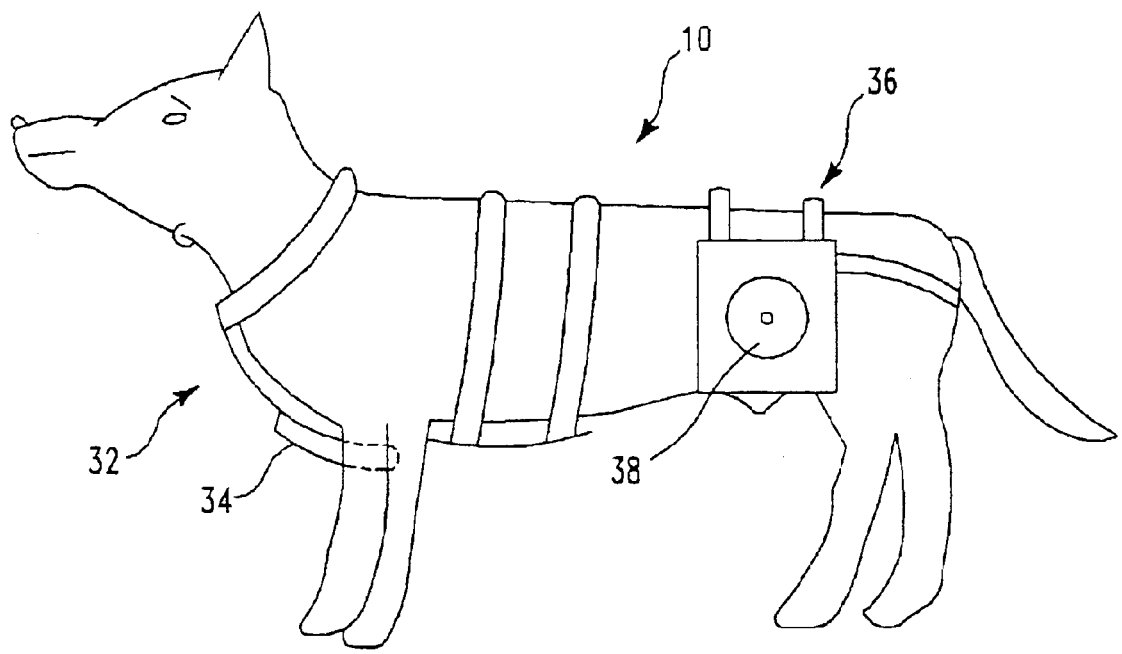
FIG. 2 is a representational diagram of the dog of FIG. 1, with exercise harnesses attached to provide one or more weights in regions adjacent to the animal's front legs and rear legs.
Figure 3:
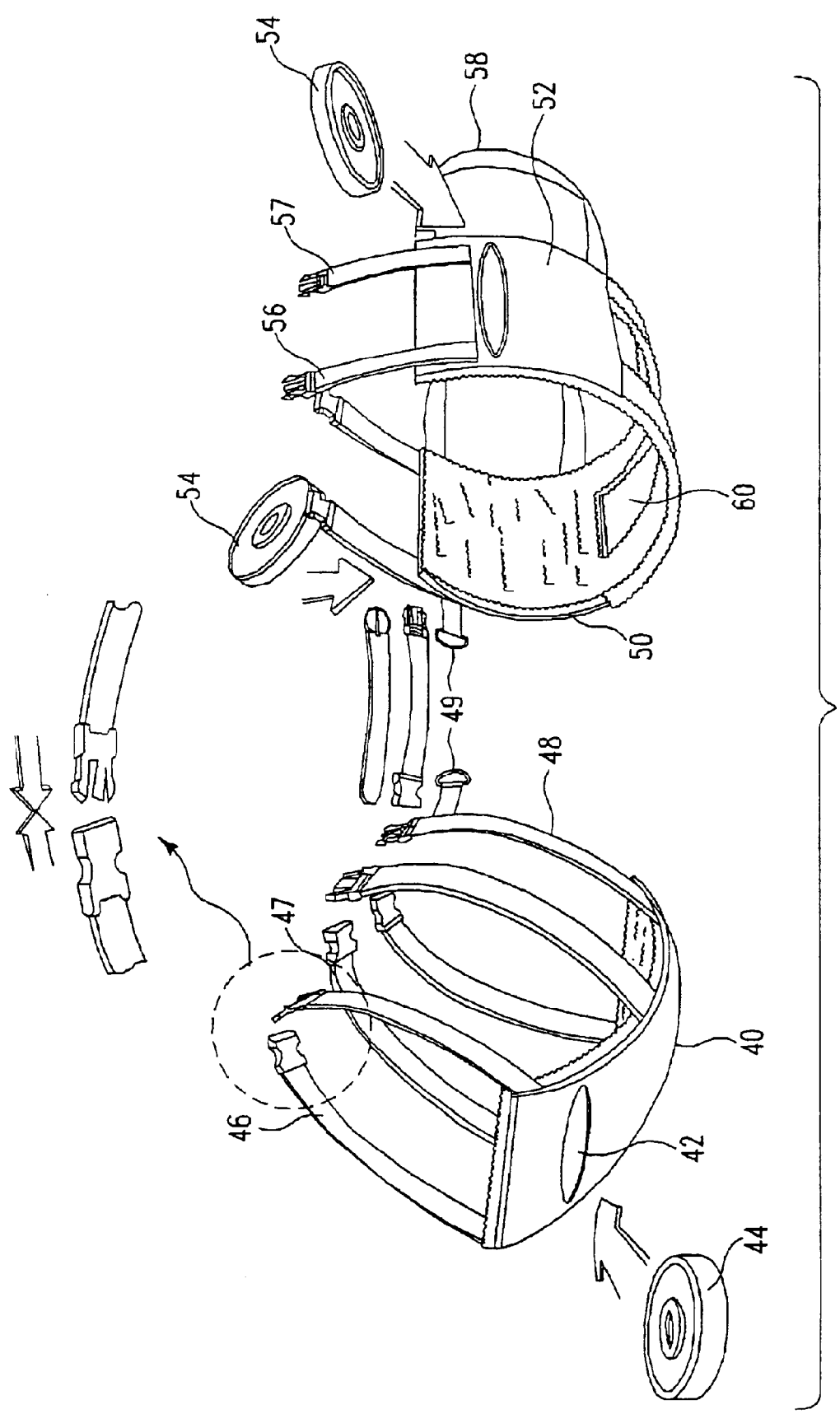
FIG. 3 is a detailed diagram showing the exercise harnesses employed in FIG. 2.

In FIG. 2, the dog 10 is shown as carrying two exercise harnesses: a first harness 32 which carries a weight 34 on the dog's chest adjacent to his front legs and a second harness 36 which carries a weight 38 on each side in the region adjacent to the dog's rear legs. The first harness and the second harness are referred to herein as the "first preferred embodiment" and the "second preferred embodiment", respectively, of the present invention. Details of these two harnesses are shown in FIG. 3 as well as in FIG. 4 (first embodiment) and FIG. 5 (second embodiment). It will be understood that the dog 10 can carry either the first embodiment or the second embodiment of the exercise harness, or both.

Figure 4:
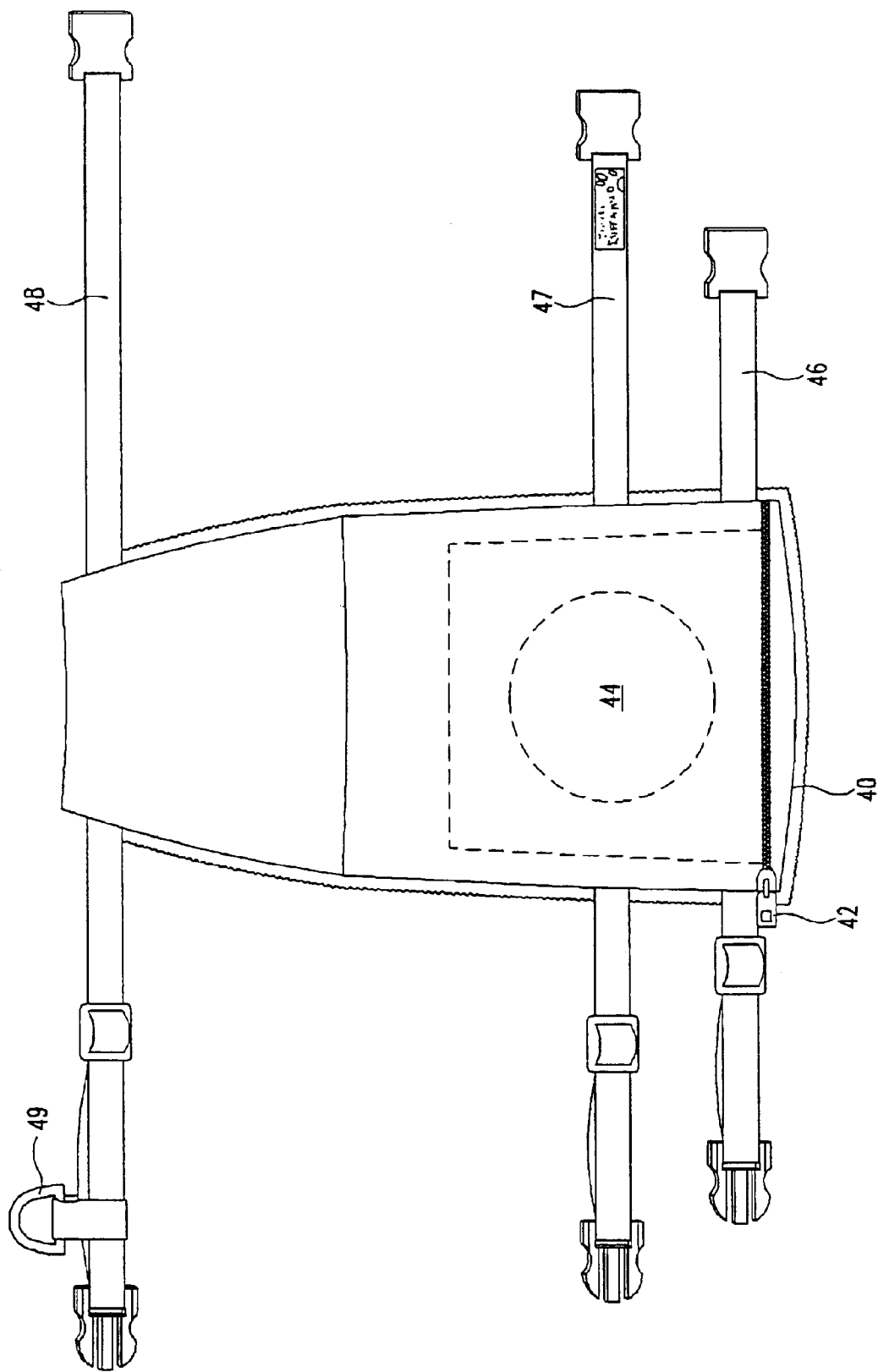
FIG. 4 is a detailed diagram of a first embodiment of the exercise harness according to the present invention which is designed to hold a weight adjacent the chest of an animal in a region adjacent the animal's front legs.

The first embodiment of the exercise harness, as shown in FIGS. 3 and 4, comprises a web portion 40 having a pocket 42 for holding a weight 44 in the region of the dog's chest, and three straps 46, 47 and 48 arranged to hold the web 40 snugly against the chest of the dog. The strap 46, or front strap, is designed to encircle the dog's neck, whereas the second and third straps 47, 48 are designed to encircle the dog's body and back.

Figure 5:
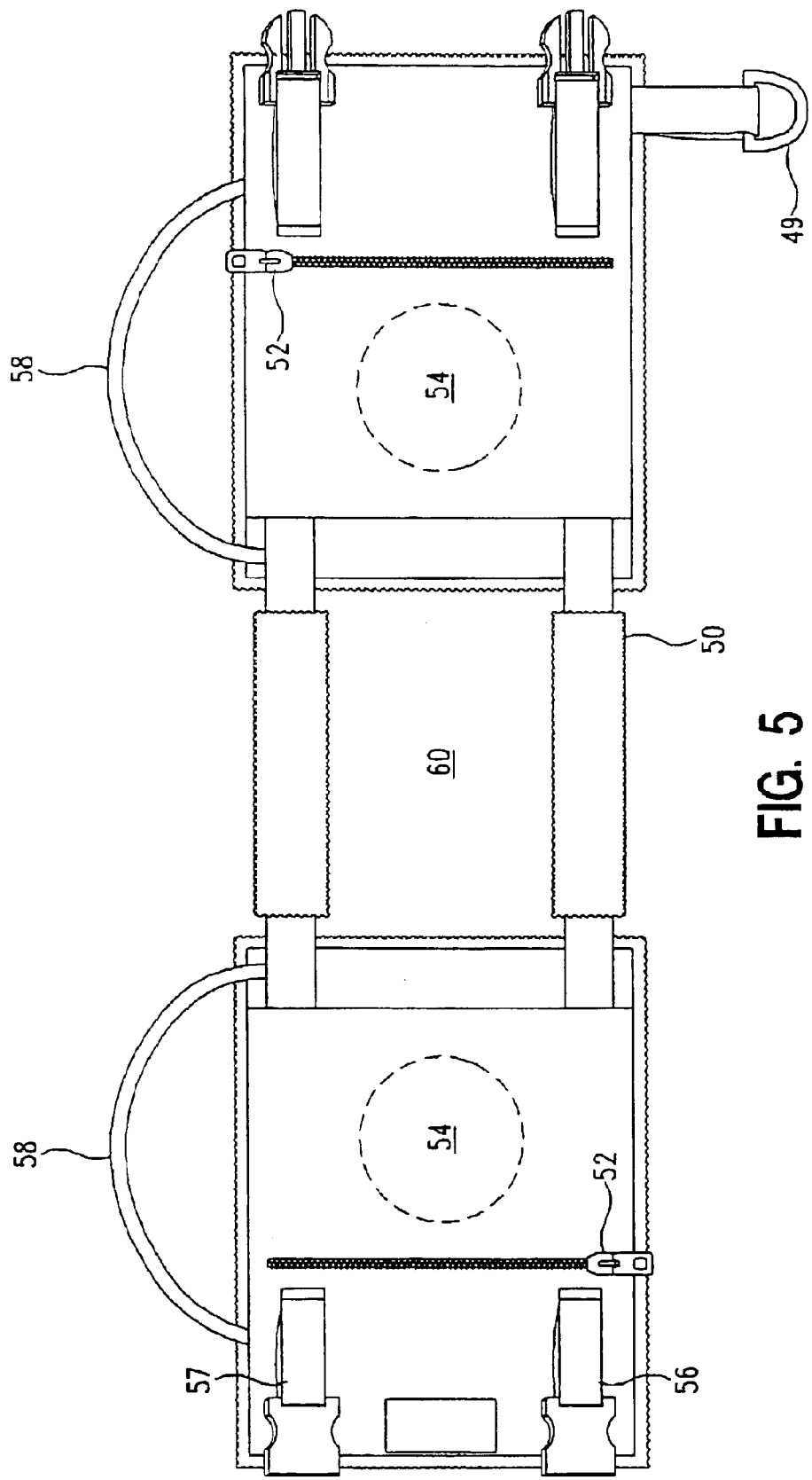
FIG. 5 is a detailed diagram of a second embodiment of the exercise harness according to the present invention which is designed to hold a weight adjacent the belly of an animal in a region adjacent the animal's rear legs.

The second embodiment of the exercise harness shown in FIGS. 3 and 5, comprises a web portion 50 adapted to surround the dog's body immediately in front of the dog's hind legs. A pocket 52 is arranged on the web to hold a weight 54 on each side of the dog when the harness is in place. Straps 56 and 57 are designed to encircle the dog's body and further straps 58 are designed to extend around the dog's rear beneath the tail, to prevent the harness from moving forward on the dog's body.

D-rings 49 are provided on both embodiments of the exercise harness to allow them to be joined together, e.g., by a separate strap, when they are both applied to a dog.

A rectangular opening 60 is provided on the web in the genital area of a male dog.

The pockets 42 and 52 are provided with zippers at their openings to insure that the weights do not slip out.

There has thus been shown and described a novel exercise harness for animals which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An exercise harness for an animal having (1) a pair of front legs and a pair of rear legs; (2) a body supported by said pairs of legs and forming (a) a chest in the region between said pair of front legs, (b) an abdomen with a back on top and a belly on the bottom between said front and rear legs and (c) a hip in the region of said rear legs; and (3) a neck and head arranged on the body adjacent said chest; said harness comprising, in combination:

(a) a first web of flexible material adapted to at least partially cover the chest, said web comprising a pocket for removably holding at least one weight at a point on said chest substantially between said pair of front legs of the animal; and (b) at least three straps, connected to said web and adapted to retain said web on the chest of the animal, a first strap arranged to surround the neck of the animal, a second strap arranged to surround the back of the animal immediately behind its front legs, and a third strap arranged to surround the back of the animal substantially midway between its front legs and its rear legs.

2. The exercise harness recited in claim 1, wherein said web is made of a material selected from the group consisting of fabric, leather, canvass and plastic sheet.

3. The exercise harness recited in claim 1, wherein said web is substantially rectangular in shape and has a central longitudinal axis, and is adapted to extend longitudinally from front to rear along the chest of the animal between the pair of front legs.

4. The exercise harness recited in claim 3, wherein the portion of said web adapted to extend between the pair of front legs is reduced in width.

5. The exercise harness recited in claim 4, wherein said portion of said web is substantially trapezoidal in shape.

6. The exercise harness recited in claim 1, wherein said at least one strap includes at least two straps, a first strap extending over the neck of the animal in front of the pair of front legs and a second strap extending over the body of the animal behind the front legs.

7. The exercise harness recited in claim 6, further comprising a third strap extending over the body of the animal behind the pair of front legs.

8. The exercise apparatus recited in claim 1, wherein the holding means includes a weight pocket on said web.

9. The exercise harness recited in claim 1, further comprising a weight which is removable and replaceable in said holding means.

10. The exercise harness recited in claim 9, wherein said at least one strap includes at least two straps extending over the body of the animal behind the pair of front legs and in front of the pair of rear legs.

11. The exercise harness recited in claim 10, further comprising a third strap extending around the rear of the body of the animal behind the two rear legs.

12. The exercise harness recited in claim 1, wherein the web is adapted to at least partially cover a lower loin area of the animal between its rear legs and said at least one strap is adapted to retain said web on said loin area.

13. The exercise harness recited in claim 12, wherein said web is substantially rectangular in shape and is adapted to extend along said lower loin area of the animal between said rear legs.

14. The exercise harness recited in claim 13, wherein the portion of said web adapted to extend between the front and rear legs of the animal is provided with an opening for male genitalia of the animal.

15. The exercise harness recited in claim 14, wherein said opening in said web is substantially rectangular shape.

16. The exercise harness recited in claim 12, wherein said holding means include means for holding two weights, one on each side of the body of the animal.

17. The exercise harness recited in claim 1, wherein said animal is dog.

18. The exercise harness recited in claim 1, further comprising:
   a second web of flexible material adapted to at least partially cover the belly of the animal, said second web comprising means for holding at least one weight; and
   at least one second strap, connected to said second web and adapted to retain said second web on said belly of the animal.

19. The exercise harness recited in claim 18, wherein said first and said second web are made of a material selected from the group consisting of fabric, leather, canvass and plastic sheet.

20. The exercise harness recited in claim 18, wherein said second web is substantially rectangular in shape and is adapted to extend along a lower loin area of the animal between its rear legs.

21. The exercise harness recited in claim 20, wherein the portion of said second web adapted to extend between the front and rear legs of the animal is provided with an opening for male genitalia of the animal.

22. The exercise harness recited in claim 21, wherein said opening in said second web is substantially rectangular shape.

23. The exercise harness recited in claim 18, wherein said holding means of said second web includes a weight pocket on said second web.

24. The exercise harness recited in claim 18, wherein said holding means of said second web is adapted to hold said weight on said second web at a point located substantially between the rear legs of the animal.

25. The exercise harness recited in claim 18, wherein said at least one strap includes at least two straps extending over the body of the animal behind the two front legs and in front of the two rear legs.

26. The exercise harness recited in claim 25, further comprising a third strap extending around the rear of the body of the animal behind the two rear legs.

27. The exercise harness recited in claim 18, further comprising a weight which is removable and replaceable in said holding means.

28. The exercise harness recited in claim 18, wherein said holding means include means for holding two weights, one on each side of the body of the animal.

* * * * *